United States Patent [19]
Lytton

[11] Patent Number: 5,384,715
[45] Date of Patent: Jan. 24, 1995

[54] SYSTEM IDENTIFICATION AND ANALYSIS OF SUBSURFACE RADAR SIGNALS
[75] Inventor: Robert L. Lytton, Bryan, Tex.
[73] Assignee: The Texas A&M Univeristy System, College Station, Tex.
[21] Appl. No.: 113,435
[22] Filed: Aug. 27, 1993
[51] Int. Cl.$^6$ .......................... G01V 3/08; G01V 3/12; G06F 15/20
[52] U.S. Cl. .................................. 364/550; 324/334; 324/337; 364/420
[58] Field of Search ............... 364/421, 422, 550, 420; 324/334, 337; 342/5

[56] References Cited
U.S. PATENT DOCUMENTS

| | | | |
|---|---|---|---|
| 4,008,469 | 2/1977 | Chapman | 324/337 |
| 4,218,678 | 8/1980 | Fowler et al. | 343/5 FT |
| 4,245,191 | 1/1981 | Schroeder | 324/337 |
| 4,258,321 | 3/1981 | Neale, Jr. | 324/334 |
| 4,430,653 | 2/1984 | Coon et al. | 343/5 NA |
| 4,504,833 | 3/1985 | Fowler et al. | 324/337 |
| 4,544,892 | 10/1985 | Kaufman et al. | 324/334 |
| 4,698,634 | 10/1987 | Alongi et al. | 342/159 |
| 4,738,377 | 4/1988 | DeMoss, Jr. | 222/1 |
| 4,835,474 | 5/1989 | Parra et al. | 324/363 |
| 5,113,192 | 5/1992 | Thomas | 342/22 |

OTHER PUBLICATIONS

Duke, S., "Calibration of Ground Penetrating Radar and Calculation of Attenuation and Dielectric Permittivity versus Depth," Masters Thesis, Dept. of Geophysics, Colorado School of Mines, 1990.

Douglas, Dennis G; Burns, Alan A.; Rino, Charles L.; Maresca, Joseph W., Jr.; Yezzi, James J., "A Study to determine the Feasibility of Using a Ground-Penetrating Radar for More Effective Remediation of Subsurface Contamination," U.S. EPA, Risk Reduction Engineering Laboratory, Report EPA/600/SR-92/089, Jun., 1992.

Lau, Chun Lok; Scullion, Tom; Chan, Paul, "Modeling of Ground Penetrating Radar Wave Propagation In Pavement Systems," prepared for Transportation Research Board, 72nd Annual Meeting, Washington, D.C., Jan. 1992.

Lau, Chun Lok; Scullion, Tom; Chan, Paul, "Using Ground Penetrating Radar Technology for Pavement Evaluations in Texas,": Proceedings 4th International Conference on Ground Penetrating Radar, Rovaniemi, Finland, Jun. 8–13, 1992, pp. 277–283.

Roddis, W. M. Kim; Maser, Kenneth; Gisi, Andrew J., "Radar Pavement Thickness Evaluations for Varying Base Conditions," Transportation Research Record 1355, pp. 90–107, 1992.

Wang, Fuming; Lytton, Robert L., "System Identification Method for Backcalculating Pavement Layer Properties," 72nd Transportation Research Board Annual Meeting, Washington, D.C., Jan. 1993.

Primary Examiner—Jack B. Harvey
Assistant Examiner—Alan Tran
Attorney, Agent, or Firm—Arnold, White & Durkee

[57] ABSTRACT

A method in accordance with the invention is implemented via a computer program to determine the density and water (or other fluid) content of the various layers within a multilayer system. For convenience, the program is referred to as SIDARS. A conventional ground penetrating radar (GPR) system is used to obtain digitized images of a reflected radar signal from a multilayer pavement system. From these images standard mathematical techniques are applied to determine the number of layers, the thickness of each layer, and the dielectric constant for each layer within the multilayer system. SIDARS takes advantage of the fact that each layer is itself composed of three distinct types of material: solids, fluids, and gases. Thus, the dielectric constant obtained for a layer is in fact a composite value, namely a combination of the layer's solid, fluid, and gas dielectric constants. SIDARS employs a wave propagation model of the pavement system to generate a synthetic reflected radar signal. Through an iterative process, initial concentration estimates of each material (solid, fluid, gas) in each layer are adjusted to minimize the mean-squared-error between the (measured) reflected and (calculated) synthetic radar signals. This process converges rapidly, is largely unaffected by initial values (over a wide range) for a layer's solids, fluid, and gas concentrations, and yields accurate values for the density and water content of each layer. Advantageously, these results have been obtained from a vehicle mounted GPR system while cruising at speeds of 40 to 50 miles per hour.

6 Claims, 10 Drawing Sheets

SYSTEM IDENTIFICATION AND ANALYSIS OF SUBSURFACE RADAR SIGNALS

1. BACKGROUND OF THE INVENTION

The invention relates to a method of determining material characteristics of individual layers within a multilayer system. For purposes of illustration, one implementation of the invention is described in connection with determining the density and water content of the different layers within a multilayer pavement system using subterranean radar signals. See. FIG. 1. It will be appreciated by those of ordinary skill having the benefit of this disclosure that the invention can be similarly implemented for other uses, e.g., analysis of the material surrounding sewer pipes, analysis of the water content in curing concrete, or analysis of asphalt content of an asphalt-concrete layer.

Appendix A, submitted as part of this specification, is a mathematical explanation of the invention's implementation described in this specification. Permission is granted to make copies of the appendix solely in connection with the making of facsimile copies of this application in accordance with applicable law; all other rights are reserved, and all other reproduction, distribution, creation of derivative works based on the contents, public display, and public performance of the appendix or any part thereof are prohibited by the copyright laws.

1.1 Background: Ground Penetrating Radar for Pavement System Analysis

The use of Ground Penetrating Radar (GPR) as a nondestructive means of probing subsurface material in pavement systems' is a goal of intensive research [Roddis et al., 1992], [Lau et al., 1992a], [Lau et al., 1992b], [Douglas et al., 1992]. A typical GPR system for pavement analysis is shown in FIG. 2.

Referring to FIG. 2, the function of the transmitter 204 is to generate a known waveform of radio-frequency (RF) energy to probe the multilayer pavement surface 102. This energy waveform is typically a sinusoidal pulse, 0.5 to 2.0 nanoseconds seconds in duration. Use of such a narrow pulse improves the GPR system's ability to distinguish small subsurface features while simultaneously limiting the depth to which it can probe. Current GPR systems such as the Penetradar Model PS-24 (Penetradar Corporation, Niagara Falls, N.Y.), can probe only one to three feet into a typical multilayer pavement system.

The narrow pulse formed by transmitter 204 is routed to an antenna 202 where it is radiated into the pavement system. As the electromagnetic pulse leaves the antenna it becomes a transmitted signal 209, traveling though free air until it strikes the pavement surface 102. A fraction of the transmitted signal 209 passes through the pavement surface and a fraction is reflected in other directions away from the air-surface interface as shown in element 210a. The process of signal transmission and reflection is repeated at each layer-layer interface as the transmitted signal 209a continues to propagate into the pavement system. At each interface the transmitted portion of the signal becomes weaker as indicated by the relative widths of signals 209b and 209c.

Layers within the pavement system are defined in terms of their electromagnetic properties such as their dielectric constant. Thus, any time two materials with different electromagnetic properties abut, there will be an interface between them that affects the transmission of a propagating RF signal.

During RF pulse transmission, an isolator 203 connects the transmitter 204 to the antenna 202. Shortly after transmission, the isolator 203 breaks this connection, making a connection between the antenna 202 and receiver 205. The function of the isolator 203 is to protect the receiver's 205 input components from damage from the high energy output of the transmitter 204.

Using one antenna for both RF pulse transmission and reception of a reflected signal 210 is called monostatic operation. If two antennas are used, one for transmission and one for reception, the operation is called bistatic. Both systems are, functionally, equivalent.

The task of the receiver 205 is to capture weak reflected signals 210 and amplify them for subsequent processing. Following reception, the captured and amplified reflected signal are passed to a signal processor 206. The specific signal processing performed depends upon the primary application of the GPR system but would, in almost all cases, include digitization so that the received signal could be placed in a digital storage device 207.

The final GPR system component is the display unit 208, the purpose of which is to present the reflected signal in a format useful to the human operator or automated signal processing unit 206. The display unit 208 is typically a CRT screen.

1.2 GPR Theory

Referring to FIG. 3, ground penetrating radar works according to a pulse-echo principle. A narrow electromagnetic pulse, generated by the transmitter 204, is radiated towards the pavement's surface through an antenna 202. For the case where the transmitted signal wave front 301 is planar with respect to the pavement surface 102, the propagation of a transmitted wave 301 along the z-axis (perpendicular to the surface of pavement system 102) in a homogeneous medium is governed by the wave equation $$\frac{\partial^2 E}{\partial z^2} = -\omega^2 \mu \epsilon E \qquad (1)$$

where E is the real part of $E_o e^{j\omega t}$. $E_o$ is the amplitude of the electric field vector in volts/meter, $\omega$ is the angular velocity in radians/second, z is the distance along the direction of propagation in meters, $\mu$ is the pavement system's magnetic permeability, and $\epsilon$ is the pavement system's complex permittivity in Farads/meter.

While the assumptions that 1) the transmitted signal's wave front is perpendicular to the pavement surface and 2) the pavement's subsurface layers are homogeneous do not hold in the strictest sense, standard practice in GPR analysis holds that they are acceptable simplifications for purposes of field use and theoretical development.

Using standard mathematical techniques, the solution to equation (1) is $$E = E_o e^{-\alpha z} e^{-j\beta z}, \qquad (2)$$

where $\alpha$ is a frequency dependent attenuation parameter and $\beta$ is a frequency dependent phase parameter related to material properties $\mu$ and $\epsilon$.

Equation (2) indicates that 1) the magnitude of the electric field of the transmitted signal 209, E, decreases as it propagates into the pavement system and 2) that its pulse shape is distorted because of the nonlinear phase term, $\beta z$.

A GPR pulse propagating inside a multilayer pavement system will undergo transmission and reflection events whenever it encounters an interface between different layers. The parameters which determine the amount of energy that is reflected (away from the signal's direction of travel) and transmitted (through to the next layer) are known as reflection (R) and transmission (T) coefficients respectively. The amplitude of the reflected ($E_r$) and transmitted ($E_t$) electric fields, for the '$n^{th}$' layer, can be expressed in terms of these coefficients in the following manner:

$$E_r(n) = R(n) \cdot E_i(n), \quad (3)$$

$$E_i(n+1) = T(n) \cdot E_i(n), \quad (4)$$

where $E_r(n)$ is the magnitude of the reflected electric field at the $n^{th}$ interface, $E_i(n)$ is the magnitude of the electric field incident to the $n^{th}$ interface, and $E_i(n+1)$ is the magnitude of the electric field transmitted through to the $n^{th}$ layer in a multilayer pavement system. Only the electric field is considered here because the typical GPR receiver detects and processes only voltage waveforms.

The effect of reflection and transmission events on the transmitted signal 209 can be seen in FIG. 4. As the transmitted pulse 401 encounters each layer in the pavement system a small portion of its energy is reflected back to the receiver 205. (Reflected signal 210 is a combination of reflected signals 210a, 210b, and 210c; temporally superimposed.) The resulting received signal 402 shows a series of peaks which denote layer-layer reflection events. Successive peaks are smaller and smaller and signify the attenuation (parameter $\alpha$ in equation 2) of the transmitted signal 209 as it propagates deeper into the pavement system.

1.3 Parameter Extraction and Modeling Techniques

The purpose of extraction procedures is to quantify key characteristics of the reflected radar signal which describe features of the pavement system under study. For example: 1) the number of peaks in a reflected signal indicates the number of layers comprising the pavement system, 2) the ratio of reflected signal peaks (402a, 402b, and 402c) provide information regarding the dielectric constant of the different layers within the pavement system, and 3) the time between peak values (402a, 402b, and 402c) can be used to determine the thicknesses of the different layers within the pavement system.

Another technique is to model mathematically the propagation and reflection of an RF pulse in a pavement system. Such a model generates a "predicted" or "synthetic" reflection signal. In this method, parameters such as layer thickness and dielectric constant are estimated. These estimates are then input to the model which calculates a synthetic signal. Parameter estimates are adjusted until there is a sufficiently good match between the reflected and synthetic signals. The final (model) values for layer thickness and dielectric constant are taken as the extracted measures.

A standard method of applying this second technique is to model the pavement system as proposed by Duke, adjusting the target parameter values using the System Identification (SID) procedure [Duke, S., 1990].

The objective of the SID process is to estimate pavement system characteristics such as layer thickness and dielectric constant, using only information about the transmitted (401) and reflected (402) signals. See FIG. 5. Parameter adjustment 505 is done in such a manner as to minimize the mean-squared-error between the received and the synthetic signal 503. An iterative SID strategy rapidly converges to a viable synthetic signal while simultaneously providing low sensitivity to initial parameter estimates [Wang & Lytton, 1993].

1.4 Difficulty of Some Current Methods

During the construction and surveying of road networks, highway departments are typically interested in values for the density and water content of subsurface layers of the pavement. Two known means of obtaining this information are: 1) taking pavement core samples and 2) through the nuclear moisture and density measurements. The first method requires workers physically to extract a sample of the pavement system which is later analyzed, typically in a special laboratory. The second method is done on site with an instrument remaining stationary until sufficient readings are made to ensure accuracy and precision of the calibrated results. Thus, obtaining density and moisture content measurements is a slow, expensive, and potentially dangerous task (owing to the fact that workers must be in the stream of traffic to acquire pavement samples).

As a result of the invasive and difficult nature of these tests the number of samples, and thus the quality of the pavement system's analysis, is limited. Securing an accurate analysis of an existing pavement network is a necessary and important task for organizations responsible for monitoring and maintaining safe highways.

2. SUMMARY OF THE INVENTION

A method, referred to herein as SIDARS, in accordance with the invention is implemented via a computer program to determine the density and water content of the various layers within a multilayer system.

In one implementation of the SIDARS method, a conventional GPR system is used to obtain digitized images of the reflected radar signal from a target multilayer pavement system. From these images, standard techniques are applied to the reflected radar signal's peak amplitudes and the time between these peak values to determine the number of layers and the dielectric constant for each layer within the multilayer system.

SIDARS takes advantage of the fact that each layer is itself composed of three distinct types of material: solids, fluids, and gases, and that the dielectric constant obtained for a layer is in fact a composite value, namely a combination of the layer's solid, fluid, and gas dielectric constants.

The SIDARS method employs a model of the multilayer system's wave propagation characteristics to generate a synthetic reflected radar signal. Along with each layer's composite dielectric constant and thickness, initial estimates for each layer's relative volumetric concentrations of solids, fluids, and gases are temporarily assumed. Here, the term "relative" implies that total layer volume is normalized to unity and divided among the three materials: 1=(relative concentration of solids)+(relative concentration of fluids)+(relative concentration of gases). Through an iterative process, described below, initial concentrations (parameters of the model) are adjusted to minimize the mean-squared-error between the reflected and synthetic radar signals.

The iterative process converges rapidly, is largely unaffected by initial values (over a wide range) for a layer's solids, fluid, and gas concentrations, and yields accurate values for the density and water (fluid) content of each layer. Advantageously, these results have been obtained from a vehicle mounted GPR system while cruising at speeds of 40 to 50 miles per hour.

(In any specific implementation, such as highway pavement system, the range over which variables such as layer thickness, layer (composite) dielectric constant, and relative concentrations of solids, fluids, and gases within a layer are relatively narrow and would be known to any worker of ordinary skill.)

By modeling a multilayer pavement system and using a mean-square-error analysis on the reflected and synthetic reflected radar signals, SIDARS makes use of all empirically collected information; not just the magnitude and relative temporal displacement of individual reflection peaks as in conventional techniques, but the shape of the signal itself. This advanced method allows material properties of the material within layers, such as density and water content, to be determined. (As a practical matter, the deeper the layer the less accurate the results, due to the loss of energy, through absorption and dispersion, of the radar signal used to probe the multilayer system).

3. BRIEF DESCRIPTION OF THE DRAWINGS

4. DETAILED DESCRIPTION OF SPECIFIC EMBODIMENTS

Figure 1:
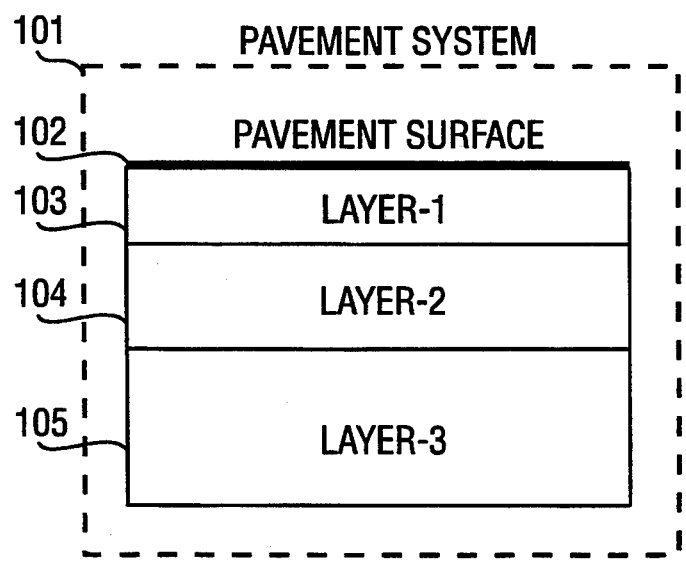
FIG. 1 is a block diagram of a multilayer pavement system.
Figure 2:
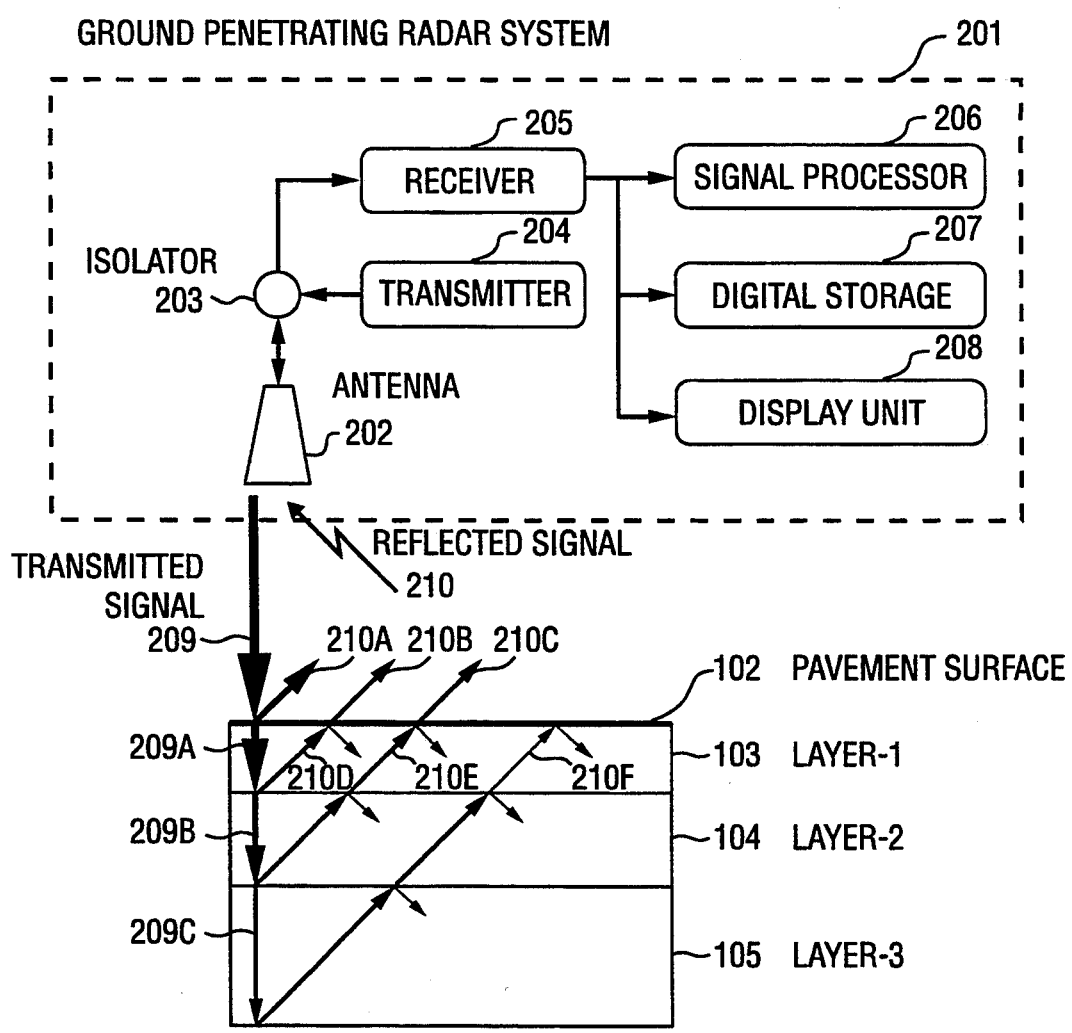
FIG. 2 is a block diagram of a Ground Penetrating Radar (GPR) system.
Figure 3:
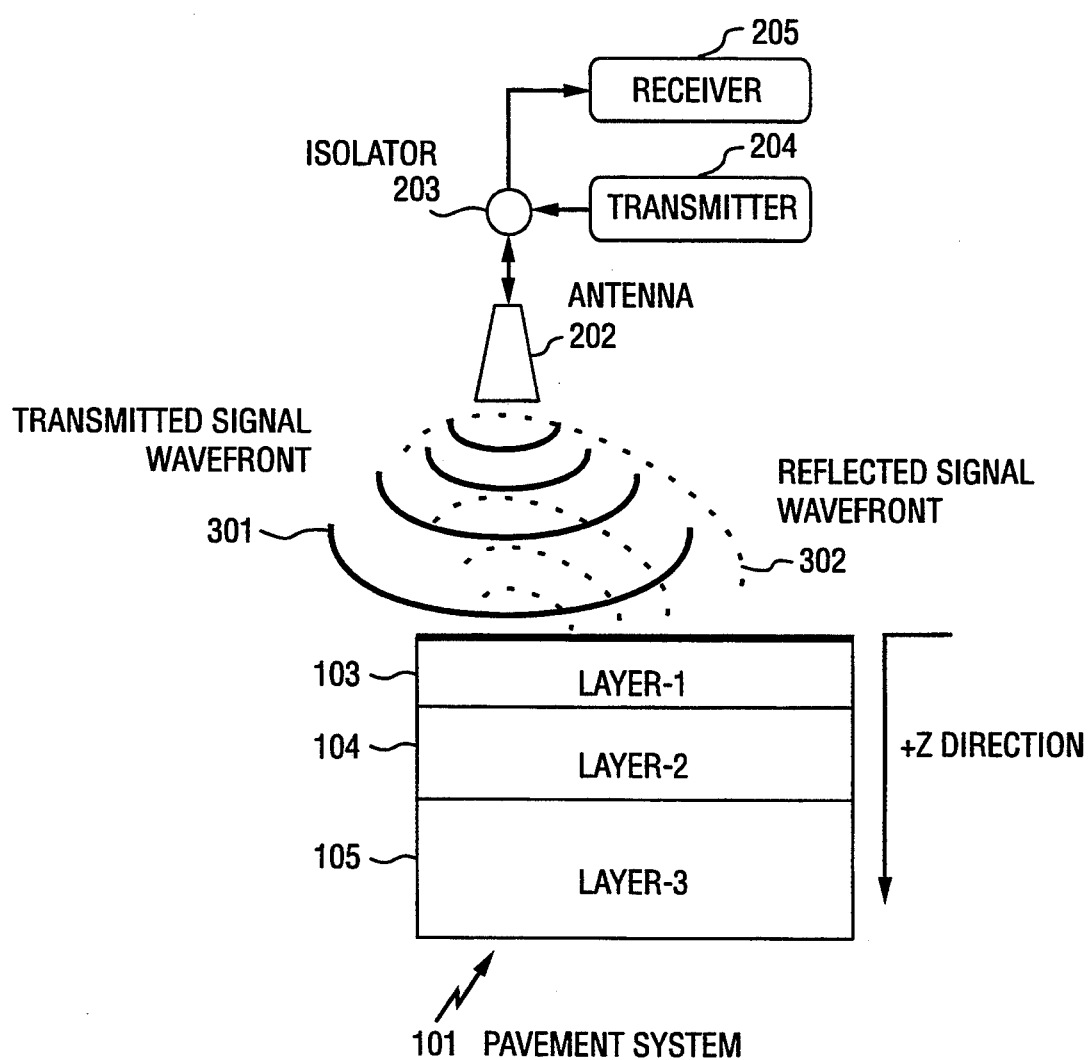
FIG. 3 is a block diagram of a GPR system detailing transmitted and reflected radar signal wave fronts.

One illustrative embodiment of a method in accordance with the invention is described in some detail below as it might be implemented in a computer program referred to as SIDARS. In the interest of clarity, not all features of an actual implementation are described in this specification. It is noted that in the development of any such actual implementation numerous programming decisions must be made to achieve the developers' specific goals (e.g., acceptable levels of output accuracy), which will vary from one implementation to another. It thus will be appreciated that such a development effort could be expected to be complex and time consuming, but would nevertheless be a routine undertaking of program development for those of ordinary skill having the benefit of this disclosure.

4.1 Overview

Application of the SIDARS method can be divided into three steps: 1) GPR system calibration, 2) data acquisition, and 3) parameter extraction. Step three, parameter extraction, is further divided into three phases: a) pavement system characterization, b) estimation of the pavement system's material properties, and c) refinement of material properties' estimates through modeling.

4.2 GPR System Calibration

Referring to FIG. 6, the GPR system is calibrated to obtain an accurate signature of transmitted signal 209. The calibration procedure used for a Penetradar Model PS-24 monostatic GPR (with a RF pulse width of 1 nanosecond and a central frequency of 1 Gigahertz) is outlined below:

a. Assemble a GPR system 201 in an open environment with the antenna 202 pointing (unobstructed) to the sky.

b. Transmit and record a single RF pulse. The received signal 601 represents the RF noise present at the time and place the calibration is performed.

c. Place a large metal plate on the surface of the target pavement system, aim the antenna 201 to emit onto this plate, transmit and record a single RF pulse. The received signal 602 represents an effectively perfect reflection.

d. Subtract waveform 601 from waveform 602 to give waveform 603. Waveform 603 is the signature of the transmitted signal emitted into the pavement system during data acquisition.

Calibration is now complete and the GPR system is ready for continuous operation over a target pavement system.

4.3 Data Acquisition

Acquisition may proceed by driving a truck-mounted GPR system over the target pavement system at speeds of up to 50 miles-per-hour (mph). The speed of travel and the rate of transmitted signal generation determine the spatial resolution of the measurement process. For instance, if the test vehicle is traveling at 45 mph (66 feet-per-second) and a transmitted signal is emitted into the roadway once every second, the measurement's spatial resolution would be approximately 13 inches. Spatial resolution can be adjusted, depending upon need, by varying either the test vehicle's speed and/or the rate of generating transmitted pulses.

4.4 Parameter Extraction

In one embodiment of the invention, parameter extraction is done after the data acquisition process has been completed. This is a matter of convenience and is not a limitation of the invention itself. The method of this invention does not preclude the simultaneous acquisition and analysis of GPR signals. As previously cited, parameter extraction is itself comprised of three phases which are detailed below.

4.4(a) Pavement System Characterization

The reflected signal 701, recorded from a portion of the roadway to be analyzed, is compared with the transmitted signal 603. Standard techniques use the ratio of amplitudes between successive reflection peaks (603a and 701a) to determine the composite dielectric constant for the pavement system's first layer. The process of comparing adjacent peak amplitudes (701a–701b and 701b–701c) is repeated to obtain values for each layer's composite dielectric constant.

The precise relationship between peak amplitudes of a reflected radar signal and layer dielectric constants is described in terms of electromagnetic theory but, functionally, is described by the following statement:

$$\epsilon_n = \left[\left(1 + \left(\frac{E_n}{E_{n-1}}\right)\right) \bigg/ \left(1 - \left(\frac{E_n}{E_{n-1}}\right)\right)\right]^2 \quad (5)$$

where $\epsilon_n$ is the dielectric constant of the $n^{th}$ layer, $E_n$ is the magnitude of the reflected radar signal from the $n^{th}$ layer, and $E_{n-1}$ is the magnitude of the reflected radar signal from the $(n-1)^{th}$ layer.

The number of major peaks (3) in the reflection signal 701 indicates that the target pavement system has three layers.

With composite dielectric constants for each layer and the velocity of electromagnetic wave propagation (in the material under study) known, equation (2) is solved for the distance between success reflection peaks, 701a–701b, 701b–701c. This distance represents layer thickness.

Initial characterization of the pavement system is now complete. These preliminary measurements have provided values for: 1) the number of layers within the pavement system, 2) the composite dielectric constant for each layer within the pavement system, and 3) the thickness of each layer within the pavement system.

4.4(b) Estimation of Material Properties

One advantage of SIDARS proceeds from the realization that each layer within a pavement system is itself composed of three distinct types of material: solids, fluids, and gases. Thus, each layer's composite dielectric constant is taken to be a combination of the layer's solid, fluid, and gas dielectric constants.

Relative volumetric concentrations of each of these three materials (solids, fluids, and gases) are assumed for each layer. Extensive data exist from a number of studies upon which to base these initial estimates and would be available or known to a worker of ordinary skill in this field.

Depending upon the type of solids, fluids, and gases thought to exist in the pavement system, a suitable dielectric constant for each is also chosen. Again, ranges over which a given material's dielectric constant varies is common knowledge to workers of ordinary skill. For convenience Table 1 identifies some common roadway materials and the ranges over which their dielectric constant may vary.

TABLE 1

| Common Roadway Construction Materials and Their Dielectric Constants | |
|---|---|
| Material | Dielectric Constant Range |
| Air | 1 |
| Asphalt | 3–6 |
| Clay | 5–40 |
| Concrete | 6–11 |
| Limestone | 4–8 |
| Sand, dry | 3–5 |
| Sand, saturated | 20–30 |
| Soil Solids | 2–10 |

TABLE 1-continued

| Common Roadway Construction Materials and Their Dielectric Constants | |
|---|---|
| Material | Dielectric Constant Range |
| Water, distilled | 81 |

4.4(c) Refinement of Estimates Through Modeling

The SIDARS method employs a RF wave propagation model 502 of the multilayer pavement system to generate a synthetic reflected radar signal 503. Through an iterative procedure described in [Wang & Lytton, 1993], initial concentrations (parameters within the model) are adjusted to minimize the mean-squared-error between the reflected (402) and synthetic (503) radar signals.

This process converges rapidly to essentially stable values of layer relative volumetric concentrations (solids, fluids, and gases) and is largely unaffected by the choice (over a wide range) of initial estimates. Final values of a layer's solid, fluid, and gas volumetric concentrations are combined to generate values for the layer's density and water concentration.

Figure 8:
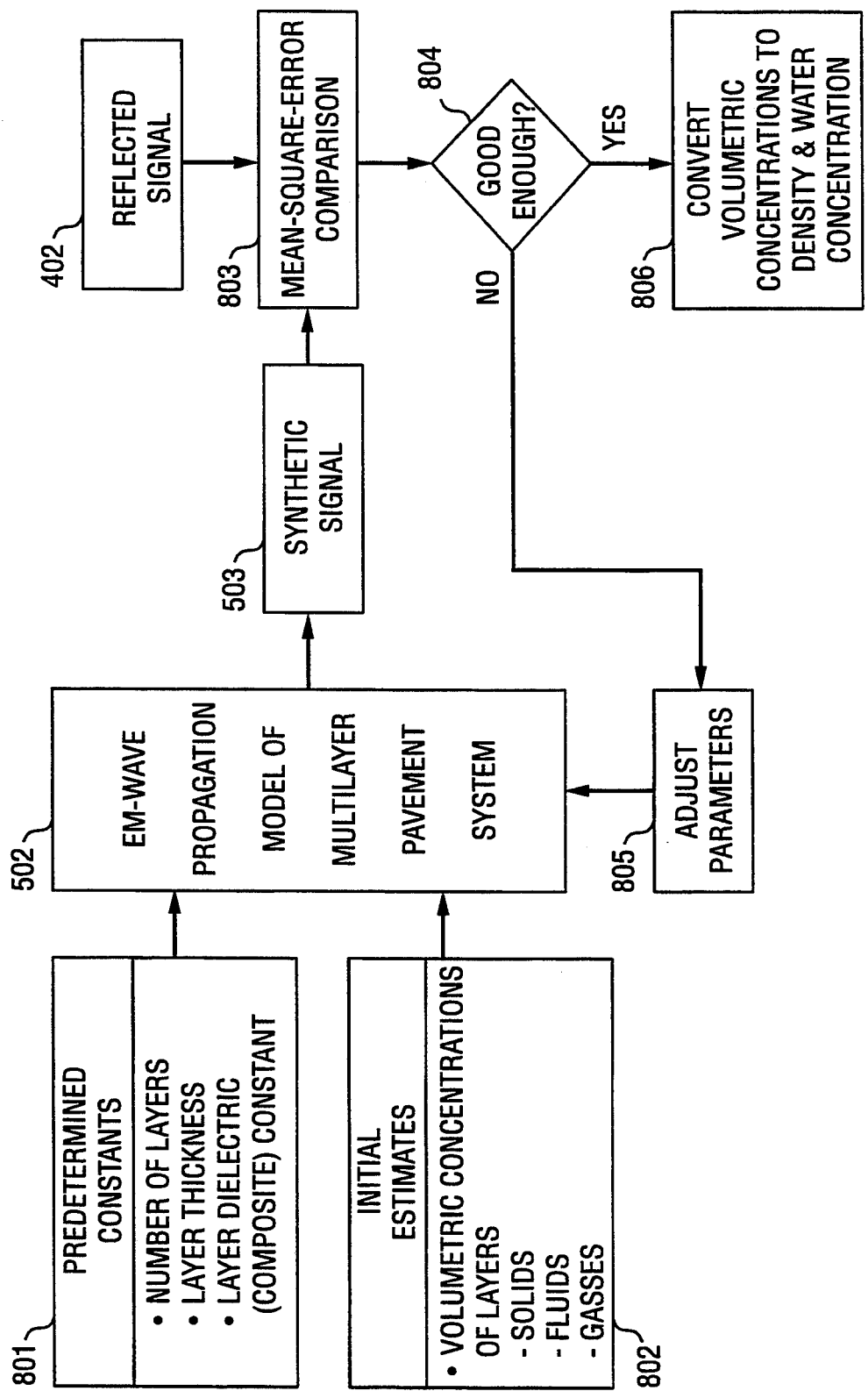
FIG. 8 is a block diagram of the System Identification and Analysis of Radar Signals (SIDARS) method.

FIG. 8 is a data-flow diagram of the iterative procedure. System characteristic values 801 and initial estimates 802 supply input to the pavement system model 502. The model 502 utilizes the Fourier transform of the transmitted signal to compute a synthetic signal 503 and is based on earlier work by [Duke, S., 1990].

Figure 9:
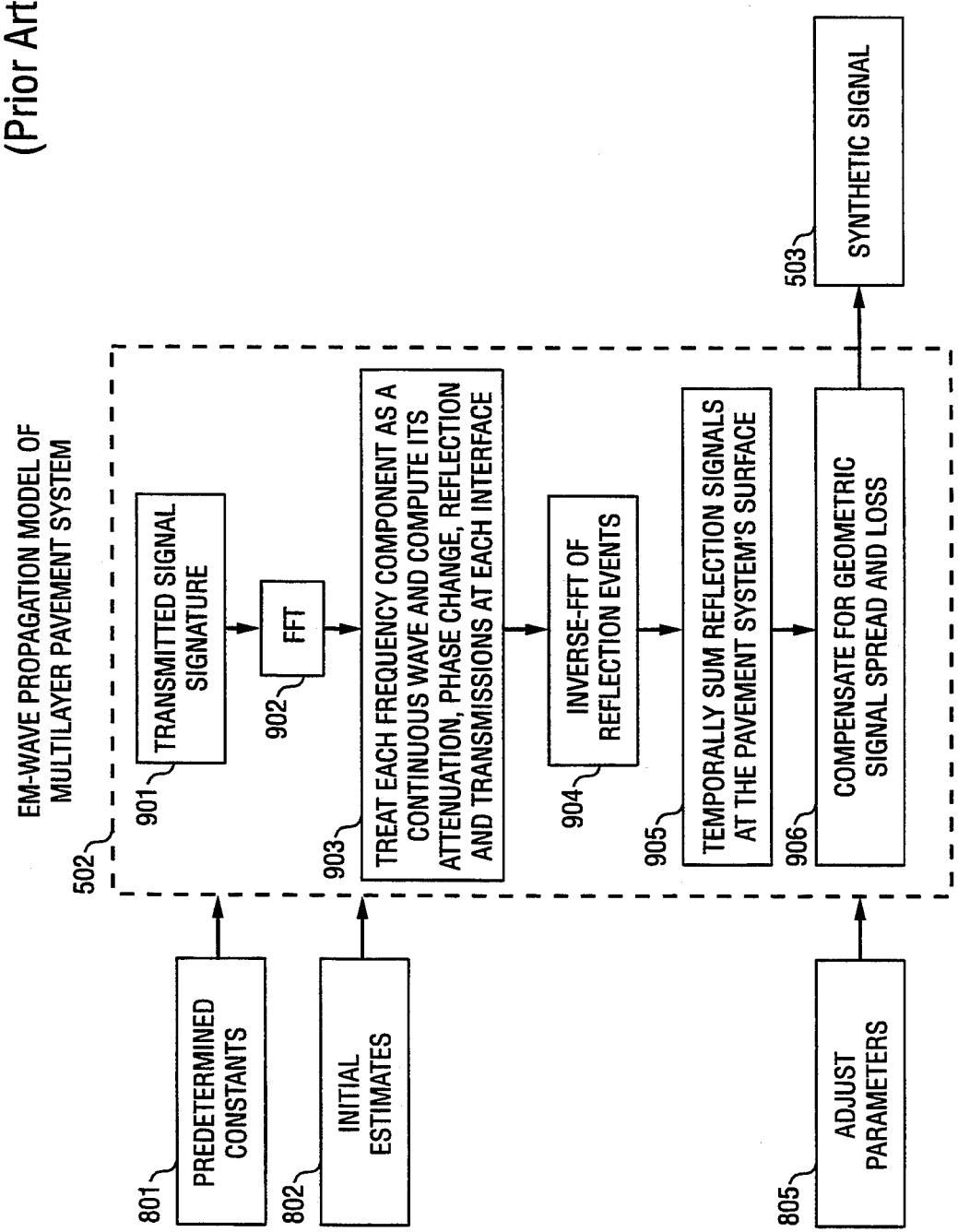
FIG. 9 is a data-flow diagram of the wave-propagation model, shown as block 502 in FIG. 8, used in SIDARS.

A detailed view of the model 502 is shown in FIG. 9. First, a fast Fourier transform (FFT) 902 of the transmitted signal 603 is taken. This frequency domain representation is used to calculate wave reflection properties at each interface within the pavement system in box 903. An inverse fast Fourier transform is taken of the resulting reflection signals in box 904. These signals are then summed in box 905 to give a signal as it would appear at the pavement surface. After compensating for spatial spreading of the signal, the result is a synthetic (predicted) reflection signal.

The synthetic signal 503 is a predicted version of the reflected signal 402. Signals 402 and 503 are compared using standard mean-squared-error 803 statistical techniques (e.g., a point-by-point comparison technique).

What constitutes a "Good Enough" match in box 804 is a function of the environment (e.g., the particular pavement system under study) and the level of error that the user is willing to accept. It is not possible to state a general rule to answer this question. A typical threshold, however, is to iterate through the model until all parameters (each layer's relative volumetric concentrations) change by less than 0.5 percent between successive trials. It takes the experience of a worker of ordinary skill in pavement analysis to make this decision.

Figure 10:
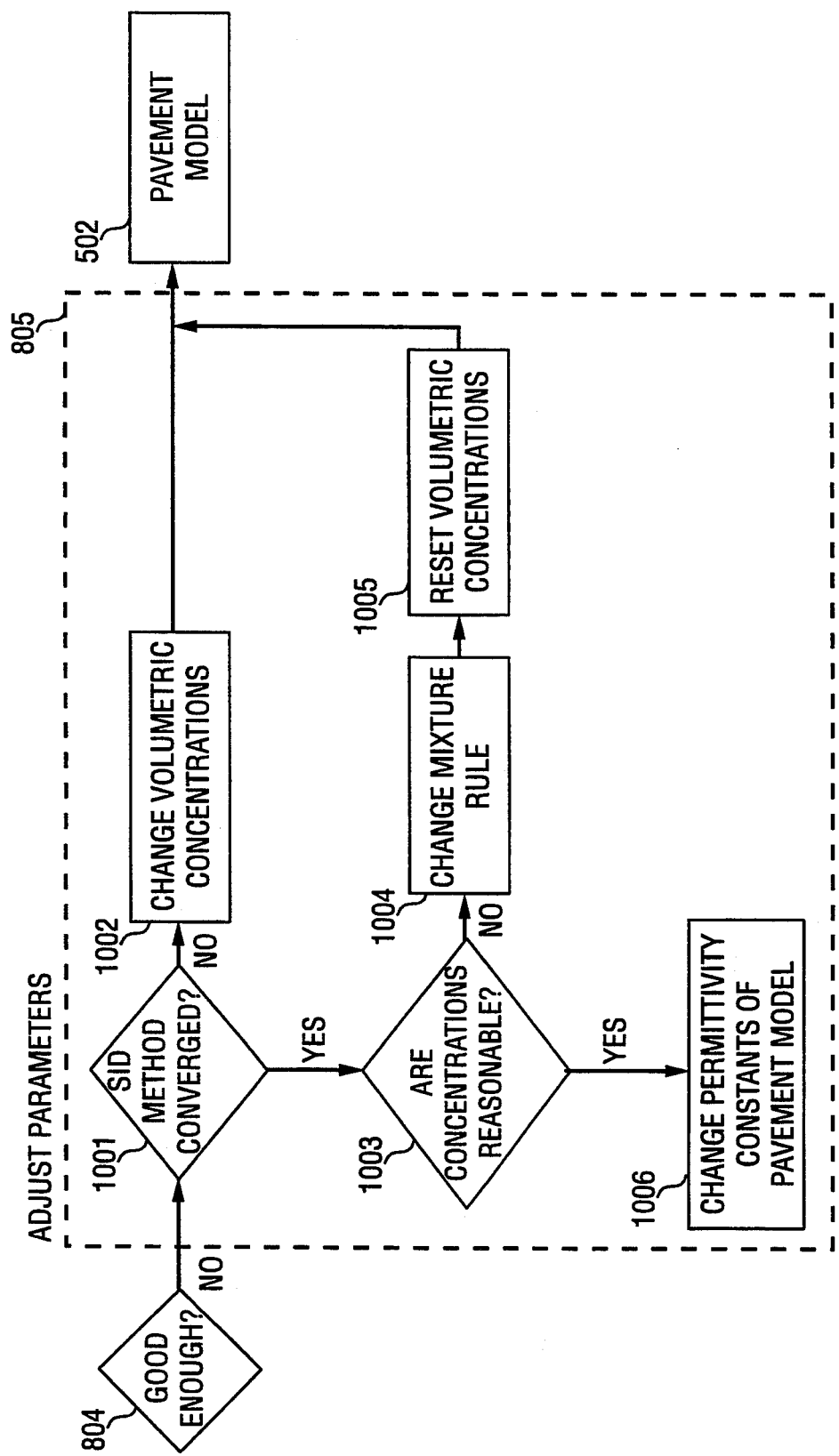
FIG. 10 is a data-flow diagram of the parameter adjustment process, shown as block 805 in FIG. 8, used in SIDARS.

Parameter adjustments 805 are made in accordance with the data-flow diagram given in FIG. 10. If the SID method has not converged, box 1001 (e.g., successive parameter adjustments have not been less than 0.5 percent), then the current relative volumetric concentration values are modified by some preset amount in box 1002 (e.g., increased or decreased by 5 percent of their current value), and another iteration through the model is begun.

If the SID algorithm had converged, box 1001, but the calculated relative volumetric concentrations are not "reasonable", box 1003, then the rule which combines the dielectric constants for each layer's component materials (solid, fluid, and gas) into a composite dielectric constant value is changed, box 1004. Standard combining functions include: 1) linear, 2) square-root, 3) micromechanics, and 4) self-consistent. Following a change in the dielectric combining rule, values for each layer's relative volumetric concentrations are reset to their original estimates at box 1005 and another iteration through the model is begun. Table 1 above shows a list of typical materials and their typical dielectric ranges. This table contains information that would be known to a worker of ordinary skill.

If the SID algorithm has converged, box 1001, and the calculated relative volumetric concentrations are within reasonable ranges, box 1003, and the match between synthetic signal 503 and reflected signal 402 is still not acceptable, the model's permittivity variables (one for each material in each layer) are adjusted at box 1006. Permittivity is an intrinsic (standard) variable of electromagnetic wave propagation models. Following a change in permittivity values, each layer's relative volumetric concentrations are reset to their original estimates, box 1005, and another iteration through the model is begun.

4.5 Comments

As a matter of practice, groups of reflected signals are averaged together, with the SIDARS method applied to the averaged signal. These groups are typically comprised of from 10 to 30 consecutive reflected signals. In other words, ten to thirty digitally recorded reflected signals are averaged (on a sample-point by sample-point basis) to generate a single average reflected signal. It is this average signal that is used as input to SIDARS. The purpose of this operation is to remove, as much as possible, reflected signal fluctuations due to random noise.

To some degree the accuracy of SIDARS output is a function of the quality of the (digitally) stored reflected signals. The sample rate of the GPR system's receiver or signal processor needs to be sufficiently high that a high resolution representation of the signal is made. This requirement is driven by the well-known sampling theory of Nyquist.

In actual tests SIDARS layer density and water concentration have been found to agree within ±1% and ±0.3% of the true values (as determined through the use of core sample techniques).

In multilayer pavement system analysis, SIDARS determines the density and water content for each layer in the pavement system. A mathematical explanation of the SIDARS method is outlined in Appendix A.

It will be appreciated by those of ordinary skill having the benefit of this disclosure that numerous variations from the foregoing illustration will be possible without departing from the inventive concept described herein. For example, the GPR system could be replaced by a acoustic energy source. In this case, the dielectric constant is replaced with another material property, the ratio of the complex modulus divided by the density of the material in each layer. Both of these properties depend upon the volumetric concentrations of solids, liquids, and gas in each material. However, the mixture rules by which the complex moduli and densities of these constituents are related to the same quantities of the composite material are different than with the dielectric constant. Accurate determination of the volumetric concentrations requires sound technical knowledge of the proper mixture rules to use.

In general, any form of wave transmission, reflection, and dispersion in a material will depend upon a complex property of that material which, in turn, depends upon the same property of each of its constituents: solids, liquids, gasses, and the volumetric concentrations of each.

Accordingly, it is the claims set forth below, and not merely the foregoing illustration, which are intended to define the exclusive rights claimed in this application.

APPENDIX A

Mathematical Derivation of Parameter Adjustment Procedure

The basic mathematical theory upon which the SID's (system's identification) parameter adjustment scheme is based is developed here. In the following section these results are applied to the invention's specific embodiment discussed in Section 4 of this specification, the analysis of a multilayer pavement system.

The SID method requires 1) accurately measured output data from the unknown, target, system, 2) a suitable model to represent the behavior of the target system, and 3) an efficient parameter adjustment algorithm which should be able to make the iteration procedure converge accurately and rapidly. If the data and the model are reliable, the success of SID analysis relies directly upon the efficiency of the parameter adjustment algorithm.

Based on the Taylor Series Expansion, an algorithm can be developed for adjusting model parameters. Let the mathematical model of some process (target system) be defined by n parameters:

$$f = f(p_1, p_2, \ldots, p_n; x, t), \text{tm (1)}$$

where x and t are independent spatial and temporal variables. If any function $f_k(p_1, p_2, \ldots, p_n; x_k, t_k)$ is expanded using a Taylor series and only first-order terms are kept, it can be shown that $$f_k(p + \Delta p) = f_k(p) + \nabla f_k \cdot \Delta p \quad (2)$$

where $\nabla$ represents the gradient operator, $\Delta x$ represents a small change in x, and the parameters have all been collected into a vector $$p = [p_1, p_2, \ldots, p_n]^T. \quad (3)$$

If we equate $f_k(p + \Delta p)$ with the actual (measured) output of the system and $f_k(p)$ with the model (calculated) output of the model for the most recent set of parameters p, the error between the two outputs becomes $$\begin{aligned} e_k &= f_k(p + \Delta p) - f_k(p) \\ &= \nabla f_k \cdot \Delta p \\ &= \frac{\partial f_k}{\partial p_1} \Delta p_1 + \frac{\partial f_k}{\partial p_2} \Delta p_2 + \ldots + \frac{\partial f_k}{\partial p_n} \Delta p_n \end{aligned} \quad (4)$$

Note that $e_k$ represents the difference between the actual system output and the model output when the independent variables take on values $x_k$ and $t_k$.

If the error is evaluated at m values (m≧n) of the independent variables x and t, the m resulting equations may be written $$e_1 = \frac{\partial f_1}{\partial p_1} \Delta p_1 + \frac{\partial f_1}{\partial p_2} \Delta p_2 + \ldots + \frac{\partial f_1}{\partial p_n} \Delta p_n \quad (5)$$

$$e_2 + \frac{\partial f_2}{\partial p_1} \Delta p_1 + \frac{\partial f_2}{\partial p_2} \Delta p_2 + \ldots + \frac{\partial f_2}{\partial p_n} \Delta p_n$$

$$\vdots$$

$$e_m = \frac{\partial f_m}{\partial p_1} \Delta p_1 + \frac{\partial f_m}{\partial p_2} \Delta p_2 + \ldots + \frac{\partial f_m}{\partial p_n} \Delta p_n$$

Equation 5 can be conveniently nondimensionalized by dividing both sides by $f_k$. Further, if we define matrices r, F and α as $$r = [r_1 r_2 \ldots r_m]^T \quad (6)$$

$$r_k = \frac{e_k}{f_k}, K = 1, 2, \ldots, m \quad (7)$$

$$F = [F_{ki}] \quad (8)$$

$$F_{ki} = \frac{\partial f_k}{\partial p_i} \cdot \frac{p_i}{f_k} \quad K = 1, 2, \ldots, m; i = 1, 2, \ldots, n \quad (9)$$

$$\alpha = [\alpha_1 \alpha_2 \ldots \alpha_n]^T \quad (10)$$

$$\alpha_i = \frac{\Delta p_i}{p_i}, i = 1, 2, \ldots, n \quad (11)$$

respectively, then (5) may be rewritten as $$r = F\alpha \quad (12)$$

or $$F^T r = F^T F \alpha. \quad (13)$$

The vector r is completely determined from the outputs of the model and the real system. The matrix F is usually called the sensitivity matrix, because its elements $F_{ki}$, reflects the sensitivity of the output, $f_k$, to the parameter $p_i$. Matrix F can be generated numerically if the analytical solution is not available. The technique used for generating the sensitivity matrix F and when it should be updated will be discussed later in this section.

The unknown vector α reflects the relative changes of the parameters. If the sensitivity matrix F or the system of equations is well behaved, it can be obtained by using a generalized inverse procedure to solve (12) [Torpunuri, V. S., "A Methodology to Identify Material Properties in Layered Viscoelastic Half Spaces," Master of Engineering thesis, Texas A&M University, College Station, Tex., 1990]. However, there might be column degeneracies in the sensitivity matrix F. This condition may be encountered when two or more parameters have similar effects, or any parameter has a negligible effect, on the behavior of the model. In these cases (12) may be ill-conditioned from the mathematical point of view, and the Singular Value Decomposition (SVD) technique is one of the alternative approaches to give a stable solution. SVD diagnoses the sensitivity matrix by calculating a condition number which is defined as the ratio of the largest of the singular values to the smallest of the singular values. F is singular if its condition number is infinite, however, the far more common situation is that some of the singular values are very small but non-zero, thus F is ill-conditioned. In these cases, SVD gives a solution by zeroing the small singular values, which corresponds to deleting some linear combinations of the set of equations. The SVD solution is very often better (in the sense of the residual $|F \alpha - r|$ being smaller) than LU decomposition or Gaussian elimination solutions.

The SVD user has to exercise some discretion, however, in deciding at what threshold to zero the small singular values. Here, the iteration method developed by Han is employed to solve (13) [Han, T. M., "A Numerical Solution for the Initial Value Problem of Rigid Differential Equation," Science Sinaca, 1976]. It is observed that Han's method not only gives the exact solution if (13) is well-posed, but also gives a stable solution if (13) is ill-posed without deleting any equations.

As soon as α is obtained, a new set of parameters is determined as $$p^{k+1} = p^k(1+\alpha) \quad (14)$$

The iteration process is continued until the desired convergence is reached. In the specific embodiment of the invention introduced in Section 4 of this specification, the convergence criterion is set to 0.5 percent for α, i.e. the iterative procedure must be repeated until all parameter changes become not more than 0.5 percent.

The sensitivity matrix F in (13) is generated using a GPR waveform synthesis model [Lau, Chun-Lok; Scullion, Tom; Chan, Paul, "Modelling of Ground Penetrating Radar Wave Propagation in Pavement Systems," 72$^{nd}$ Transportation Research Board Annual Meeting, Washington, D.C., January, 1992]. The derivatives $$\frac{\partial f_k}{\partial p_i},$$

where $f_k$ (k=1, 2, ..., m) represent the magnitude of the reflected signals and $P_i$ (i=1, 2, ..., n) the pavement layer property parameters (i.e., relative volumetric concentrations of solids, fluids, and gases within each layer), are computed as the forward-derived differences. Thus, the sensitivity matrix F can be generated by (n+1) runs of the GPR waveform synthesis model.

It is found that the sensitivity matrix may be used for more than one iteration. If the parameters have been changed "much", however, it has to be regenerated because it only takes account of the first-order Taylor series and the problem is highly nonlinear, which means that the sensitivity values depend on the parameter values. Otherwise the iteration procedure might not converge, or more often, it may converge very slowly. In the specific embodiment of the invention discussed in Section 4 of this specification, the sensitivity matrix is updated when one of the following conditions are encountered:

(1) Some parameter(s) has been increased more than 100 percent during the past iteration(s); or
(2) Some parameter(s) has been decreased more than 50 percent during the past iteration(s); or
(3) The sensitivity matrix has been used for 3 iterations, but the 0.5 convergence criterion is not achieved.

Mathematical Description for Specific Embodiment of Invention

To provide a concrete illustration of how the above derivation is applied to the SIDARS method for analyzing a multilayer pavement system, consider the following example.

First, assume a three layer pavement system as shown in FIG. 1. Next, recall that SIDARS decomposes each layer into three constituent parts: solids, fluids, and gases. Variable p represents the vector of unknown values, namely the relative volumetric concentrations of solids, fluids, and gases for each layer. Let $p^s$ represent the relative volumetric concentration of solids, $p^f$ the relative volumetric concentration of fluids, and $p^g$ the relative volumetric concentration of gases.

The number of free variables for the model is therefore nine; three for each of the three layers. However, because each layer's volume is entirely determined by its solid, fluid, and gas components, only two of the three variables for each layer need be found—the third is uniquely determined if the other two are known. For convenience, assume we allow the relative volumetric concentrations of solids, $p^s$, and fluids, $p^f$, to be the free variables. The relative volumetric concentration of gases for each layer is then found by:

$$1 = p^s + p^f + p^g, \text{ or} \quad (15)$$

$$p^g = 1 - (p^s + p^f). \quad (16)$$

With this simplification, the number of free variables in (12), n, becomes six. (Note that this is an advantageous realization because it makes the sensitivity matrix F smaller and, therefore, easier/faster to compute). The vector of unknowns, p, then becomes $$p = (p_1^s, p_1^f, p_2^s, p_2^f, p_3^s, p_3^f), \quad (17)$$

where the numeric subscript denotes the layer number and the alphanumeric superscript the layer's material, solid (s) or fluid (f).

Next, the number of points, m, at which the model is evaluated becomes the number of digital samples taken of each reflected signal 402. Finally, the model f in (1) describes the magnitude of the reflected signal's electric field, E; $E_1$ is the (calculated) value of the electric field at the first sample point, $E_2$ is the (calculated) value of the electric field at the second sample point, ..., and $E_m$ is the (calculated) value of the electric field at the $m^{th}$ sample point.

Applying these substitutions and expanding (12) gives the following statement of the SIDARS method for a three layer pavement system:

$$r = F \times \alpha$$

$$\begin{bmatrix} \frac{E_1^{meas} - E_1}{E_1} \\ \frac{E_2^{meas} - E_2}{E_2} \\ \vdots \\ \frac{E_m^{meas} - E_m}{E_m} \end{bmatrix}_{m \times 1} = \begin{bmatrix} \frac{\partial E_1}{\partial p_1^s} \times \frac{p_1^s}{E_1} & \frac{\partial E_1}{\partial p_1^f} \times \frac{p_1^f}{E_1} & \cdots & \frac{\partial E_1}{\partial p_3^f} \times \frac{p_3^f}{E_1} \\ \vdots & & & \vdots \\ \frac{\partial E_m}{\partial p_1^s} \times \frac{p_1^s}{E_m} & \cdots & \frac{\partial E_m}{\partial p_3^s} \times \frac{p_3^s}{E_m} & \frac{\partial E_m}{\partial p_3^f} \times \frac{p_3^f}{E_m} \end{bmatrix}_{m \times 6} \times \begin{bmatrix} \frac{p_1^s(i+1) - p_1^s(i)}{p_1^s(i)} \\ \frac{p_1^f(i+1) - p_1^f(i)}{p_1^f(i)} \\ \frac{p_2^s(i+1) - p_2^s(i)}{p_2^s(i)} \\ \frac{p_2^f(i+1) - p_2^f(i)}{p_2^f(i)} \\ \frac{p_3^s(i+1) - p_3^s(i)}{p_3^s(i)} \\ \frac{p_3^f(i+1) - p_3^f(i)}{p_3^f(i)} \end{bmatrix}_{6 \times 1}$$

where (i) and (i+1) imply the value at the $i^{th}$ and $i^{th}$-plus-one iteration and $E_j^m$ is the measured value of the reflected signal at the $j^{th}$ sample point. Minimizing the mean-square-error will force each element fo r towards zero. Convergence implies each element of $\alpha$ does not change (within some pre-specified limit) from one iteration to the next.

REFERENCES CITED

1. Duke, S., "Calibration of Ground Penetrating Radar and Calculation of Attenuation and Dielectric Permittivity versus Depth," Masters Thesis, Dept. of Geophysics, Colorado School of Mines, 1990.
2. Douglas, Dennis G; Burns, Alan A; Rino, Charles L.; Maresca, Joseph W., Jr.; Yezzi, James J., "A Study to Determine the Feasibility of Using Ground-Penetrating Radar for More Effective Remediation of Subsurface Contamination," U.S. EPA, Risk Reduction Engineering Laboratory, Report EPA/600/SR-92/089, June, 1992.
3. Lau, Chun Lok; Scullion, Tom; Chan, Paul, "Modeling of Ground Penetrating Radar Wave Propagation In Pavement Systems," prepared for Transportation Research Board, 72nd Annual Meeting, Washington, D.C., January, 1992a.
4. Lau, Chun Lok; Scullion, Tom; Chan, Paul, "Using Ground Penetrating Radar Technology for Pavement Evaluations in Texas," Proceedings $4^{th}$ International Conference on Ground Penetrating Radar, Rovaniemi, Finland, Jun. 8-13, 1992b, pp 277-283.
5. Roddis, W. M. Kim; Maser, Kenneth; Gisi, Andrew J., "Radar Pavement Thickness Evaluations for Varying Base Conditions," Transportation Research Record 1355, pp 90-107, 1992.
6. Wang, Fuming; Lytton, Robert L., "System Identification Method for Backcalculating Pavement Layer Properties, $72^{nd}$ Transportation Research Board Annual Meeting, Washington, D.C., January, 1993.

What is claimed is:

1. A method of determining the respective volumetric proportions, in a target layer of a multilayer system, of one or more of a solid portion of the target layer, a fluid portion of the target layer, and a gaseous portion of the target layer, comprising the steps of:

(a) directing an energy pulse into the target layer of the system;
(b) receiving a combined reflection signal from the system;
(c) generating a measurement vector signal in which is encoded a characteristic of the combined reflection signal;
(d) generating an estimate vector signal in which is encoded respective estimated volumetric proportions of said one or more of the target layer's solid, fluid, and gas portions;
(e) generating an error value signal representing a differential between the measurement vector signal and the estimate vector signal;
(f) testing whether a characteristic of the error value signal is greater than a predetermined criterion and
(1) if so, then
(A) adjusting the estimate vector signal to encode adjusted respective estimated volumetric proportions, and
(B) repeating steps e and f;
else, (2) generating a layer-content signal in which is encoded the respective estimated volumetric proportions encoded in said estimate vector signal.

2. The method of claim 1 wherein the fluid portion of the target layer comprises water.

3. The method of claim 1 wherein the energy pulse is electromagnetic.

4. The method of claim 1 wherein the combined reflection signal comprises a plurality of reflection signals, each reflection signal being a reflection of the energy pulse from a different location in the system and wherein the measurement vector signal comprises a plurality of measurement elements, each measurement element representing an instantaneous value of a characteristic such as the magnitude, phase, or frequency of a respective reflection pulse.

5. The method of claim 1 wherein, the estimate vector is generated by a process using a forward propagating wave transmission model.

6. A method of modeling the density and water content of a target layer in a multilayer formation, comprising the steps of:
(a) transmitting a radar signal into the formation,
(b) receiving a reflected radar signal back from the formation,
(c) converting the reflected radar signal to a digitized reference signal,
(d) generating a modeled reflection synthetic signal that represents the reflected radar signal that would be expected to be received from a model formation having a model target layer with a specified density and specified water content;
(e) testing whether the synthetic signal matches the reference signal to within a predetermined degree of satisfaction;
(f) if the test of step (e) is satisfied then generating a success signal indicating that the density and water content of the target layer in a multilayer formation are satisfactorily approximated by the density and water content in the model target layer; else altering the synthetic signal to represent an adjustment to the model target layer in accordance with a predetermined iterative procedure and repeating steps (d) through (f).

* * * * *

UNITED STATES PATENT AND TRADEMARK OFFICE
CERTIFICATE OF CORRECTION

Patent No.:  5,384,715

Dated:  January 24, 1995

Inventors:  Robert L. Lytton

It is certified that error appears in the above-identified patent and that said Letters Patent are hereby corrected as shown below:

Column 5, line 35, delete the numeric identifier "4" and insert --4A--.

Column 5, line 35, after the word "showing", insert --a--.

Column 5, lines 35-36, delete the words "and reflected".

Column 5, line 36, delete the word "signals" and insert --signal--.

Figure 4A:
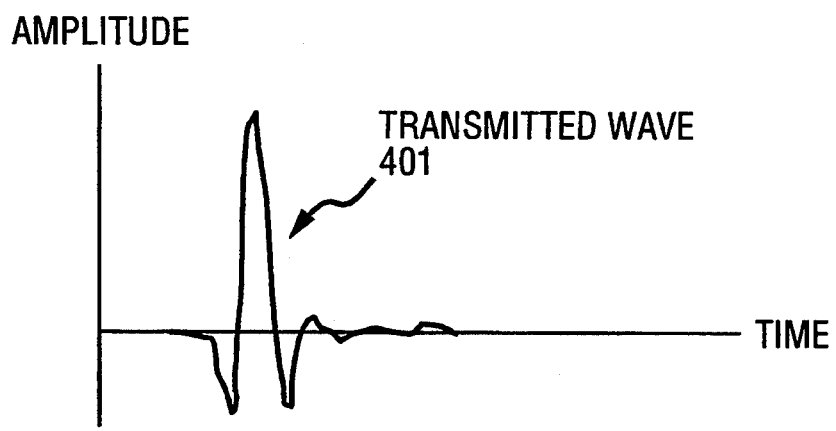
FIG. 4 is a diagram showing typical transmitted and reflected radar signals.
Figure 4B:
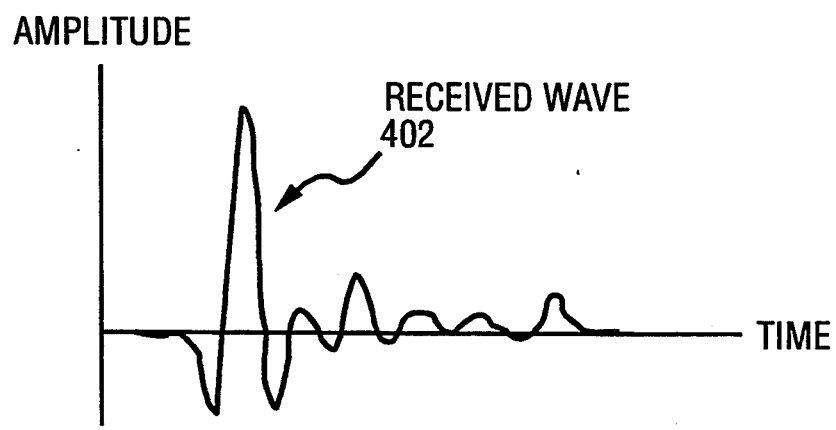
Figure 5:
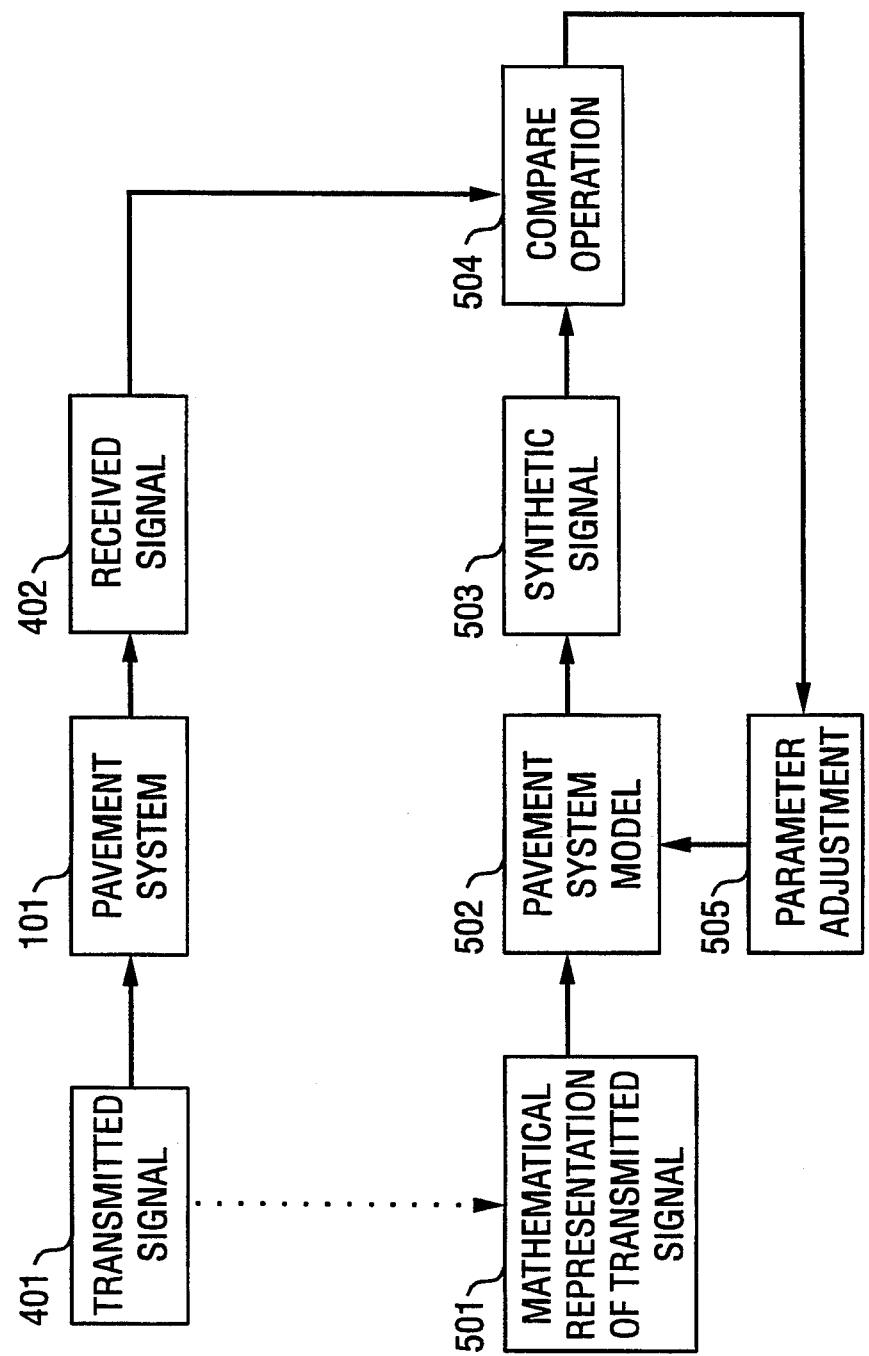
FIG. 5 is a block diagram of the Systems Identification (SID) approach to signal analysis.

Column 5, line 37 (before the paragraph describing Figure 5), insert --FIG. 4B shows a typical reflected radar signal.--

Column 5, line 39, delete the words "6 shows a series of radar signals generated" and insert --6A shows a typical RF signal transmitted toward the sky--.

Figure 6A:
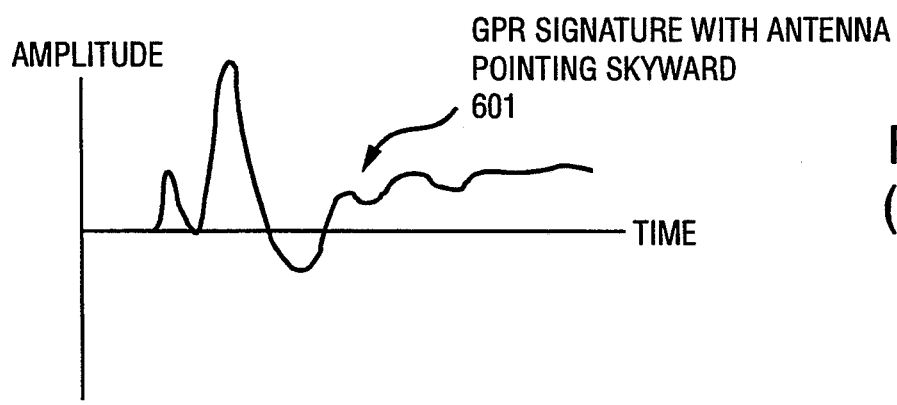
FIG. 6 shows a series of radar signals generated during GPR system calibration.
Figure 6B:
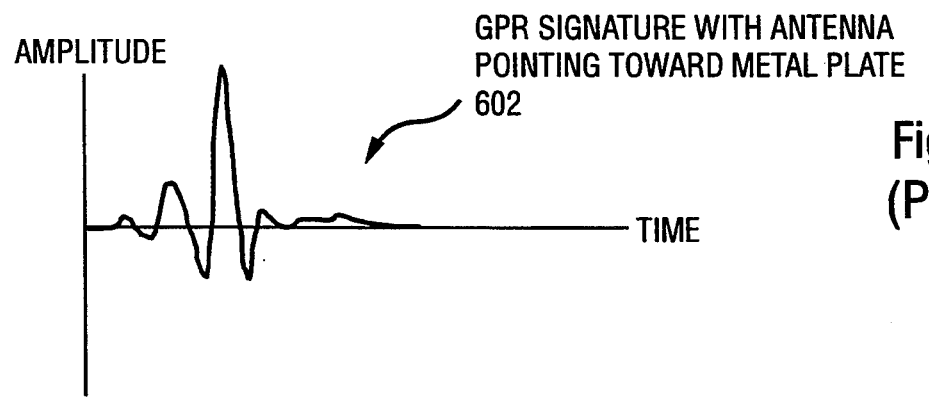

Column 5, line 41, (after the paragraph describing Figure 6A), insert --FIG. 6B shows a typical RF signal transmitted toward a metal plate during GPR system calibration--.

Figure 6C:
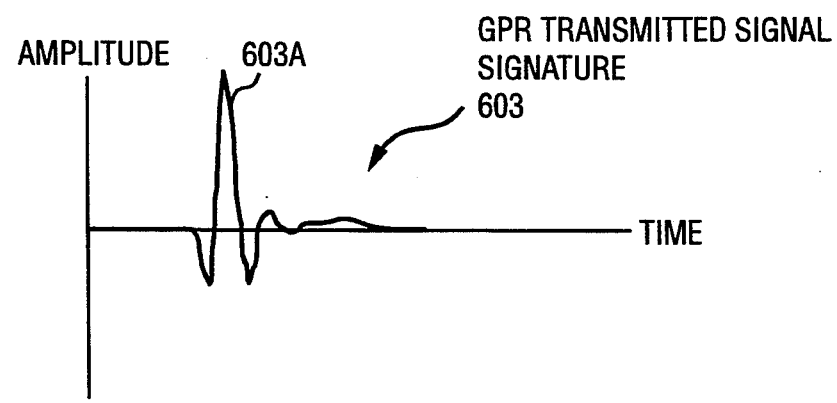
Figure 7:
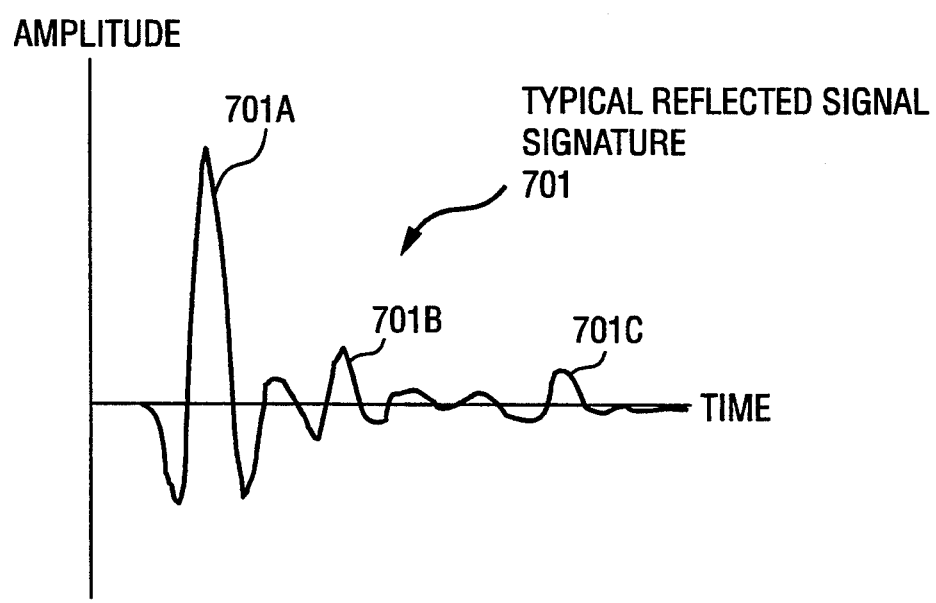
FIG. 7 shows a typical radar signal that has been reflected from a 3-layer pavement system.

Column 5, line 41 (before the paragraph describing Figure 7), insert --FIG. 6C shows a typical RF signal emitted into a pavement system by an operational GPR system--.

UNITED STATES PATENT AND TRADEMARK OFFICE
CERTIFICATE OF CORRECTION

Page 2 of 2

PATENT NO. : 5,384,715
DATED : January 24, 1995
INVENTOR(S) : Robert L. Lytton

It is certified that error appears in the above-indentified patent and that said Letters Patent is hereby corrected as shown below:

Column 6, line 13, delete the words "FIG. 6" and insert --FIGS. 6A, 6B and 6C--.

Signed and Sealed this

Thirtieth Day of May, 1995

BRUCE LEHMAN

*Attest:*

*Attesting Officer*              *Commissioner of Patents and Trademarks*